Jan. 21, 1964  W. H. EVANS  3,118,324
REAMER FORMING METHOD
Filed Dec. 30, 1960
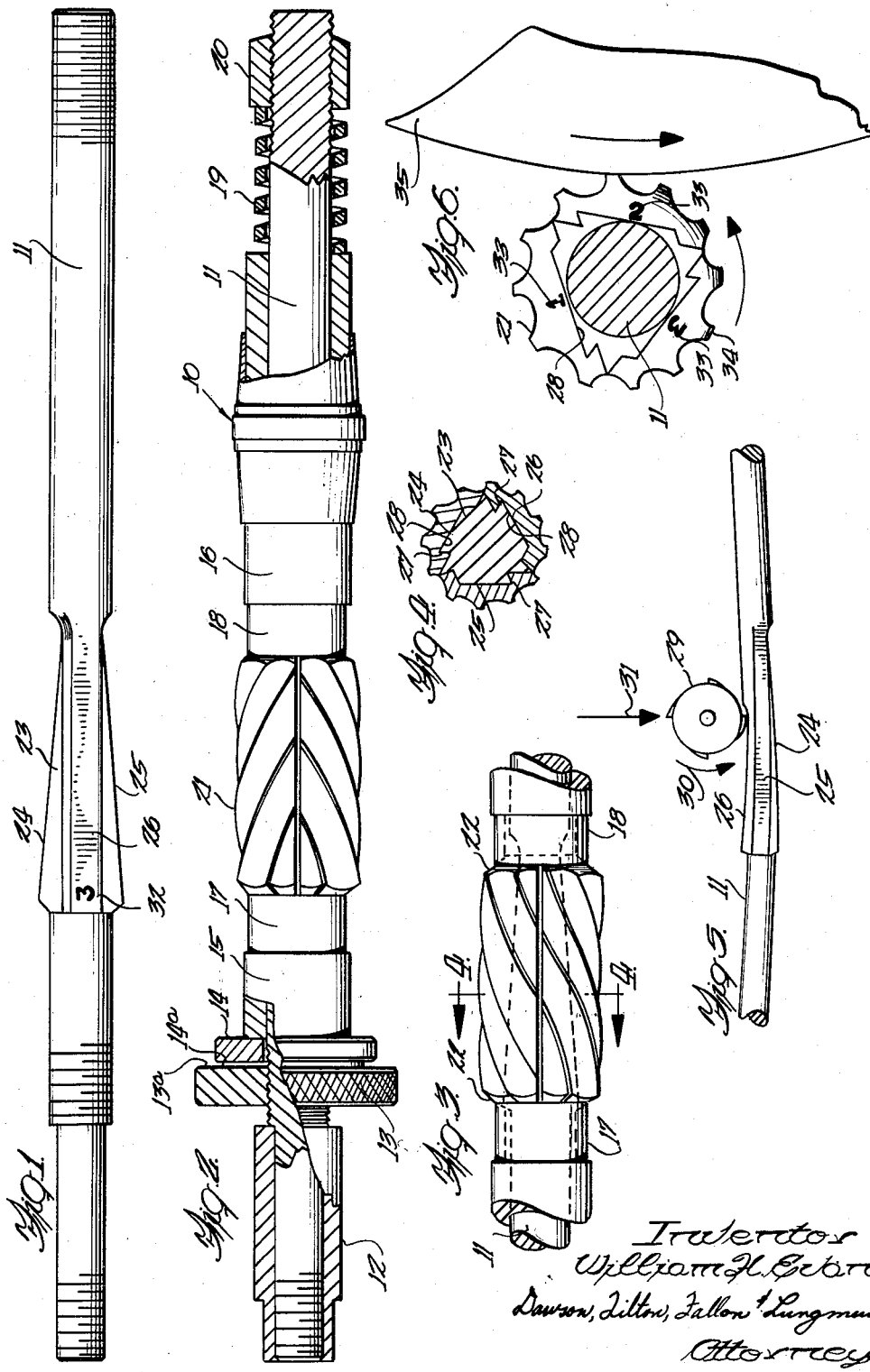
Inventor
William H. Evans
Dawson, Tilton, Fallon & Lungmus
Attorneys

United States Patent Office 3,118,324
Patented Jan. 21, 1964

3,118,324
REAMER FORMING METHOD
William H. Evans, 1415 Marseille Drive,
Miami Beach, Fla.
Filed Dec. 30, 1960, Ser. No. 79,620
3 Claims. (Cl. 76—108)

This invention relates to a reamer forming method and, more specifically, to a method of making a multiple-blade expansion reamer adapted for use on a line-reaming and boring machine.

As is well known, multiple blade expansion reamers are commonly used for reaming and refinishing the worn wrist pin bearings of internal combustion engines. Such a reamer ordinarily consists of a mandrel having a portion adapted to support a plurality of circumferentially-spaced reamer segments. The segments are then held in place by retainer rings which encircle the mandrel and which engage opposite ends of the segments.

It has been found that the blade segments of a conventional multiple-blade reamer are often "out of round." While the eccentricity may be very slight, it nevertheless affects the usefulness of the structure as a precision tool. In addition, any amount of eccentricity will tend to cause unequal wear of the cutting edges of the various blade segments with the result that a reamer may be totally unfit for use even though only a few of its many cutting edges have become worn.

Accordingly, a principal object of the present invention is to provide a method of forming an improved adjustable reamer in which the cutting edges of the reamer segments are concentric with the reamer shaft despite differences in the supporting surfaces for the several segments. Another object is to provide a method of forming a reamer which involves custom fitting each reamer segment upon its particular supporting surface of a mandrel. A further object is to provide a method of forming a reamer unit which fully compensates for differences and deformations in the reamer mandrel created during the milling or machining of that mandrel.

Other objects will appear from the specification and drawings in which:

FIGURE 1 is a side elevational view of a finished reamer mandrel formed in accordance with the method of the present invention;

FIGURE 2 is a side elevational view, taken partly in section, of a completed reamer;

FIGURE 3 is a broken side elevational view illustrating another view of the mounted reamer segments;

FIGURE 4 is a cross sectional view taken along line 4—4 of FIGURE 3;

FIGURE 5 is an exaggerated and somewhat diagrammatic view showing a preliminary step in the method of the present invention;

FIGURE 6 is an enlarged, fragmentary, cross sectional view of a final step in the present method.

Referring to the drawings, the numeral 10 generally designates a reamer assembly comprising a mandrel 11, a bushing 12, an adjusting nut 13, a pressure head 14, sleeves 15 and 16, retainer rings 17 and 18, helical spring 19, adjustment nut 20 and reamer segments 21.

Bushing 12 is threadedly secured to the mandrel and is adapted to be connected to a rotary drive shaft of a line reaming machine and all reamer drives, as illustrated generally in my Patent No. 2,584,005. The tension adjusting nut 13 has a knurled outer surface and is threaded loosely upon the mandrel so that it may be easily rotated when adjustment is required. In addition, the loose mounting of the adjustment nut permits the nut to tip slightly so that the force exerted by compression spring 19 and transmitted through the sleeves, retainer rings, blade segments and pressure head, all being slidably mounted upon the mandrel, will be applied equally by the projections 14a of the pressure head against the hard and glass-like surface 13a of the adjustment nut. The three projections 14a are substantially uniformly spaced from the longitudinal axis of the mandrel 11 and the tops of those projections, as well as the smooth bearing surface of the adjusting nut 13, are case hardened to reduce wear and facilitate relative movement between the parts.

Referring to FIGURE 3, it will be observed that the retaining rings 17 and 18 have internal dimensions substantially greater than the cross sectional dimensions of the mandrel and, therefore, the enlarged rings fit loosely upon the mandrel. In addition, the opposing ends of the rings are beveled to receive the beveled or tapered end surfaces 22 of the cutting segments 21. As a result of their loose fit, the rings 17 and 18 are capable of limited lateral displacement upon the mandrel and are capable of self-seating against the inclined or beveled ends of the blades in response to longitudinal forces imposed by spring 19.

Since the structure briefly described above is old and well known, a further description is believed unnecessary for the purpose of disclosing the product to be formed by the process of the present invention. The improved structure, and the method by which that structure is formed, will now be described.

In FIGURE 1 it will be seen that mandrel 11 is provided with a tapered segment supporting portion 23 intermediate the ends thereof. Portion 23 provides three hook-like formations 24—26 which are longitudinally along their leading edges 27 (FIGURE 4). The underside of each cutting segment 21 is provided with a recess 28 for receiving a hook-like formation of the mandrel. The cutting segments are slidable longitudinally along the straight inclined surfaces 28 of the hook formations 24—26 making minor adjustment in the effective cutting diameter of the reamer.

One aspect of the present invention lies in the discovery that slight but detectable eccentricity of the cutting segments is caused by differences in the inclination and position of each of the hook supports 24—26 and that such differences occur at least in part because of progressive changes in the mandrel as it is milled or machined. In machining a mandrel to provide the segment-support surfaces, a noticeable variation in deflection occurs in the area of the blade supporting portion 23. This deflection is the least when machining the first segment-support formation of a series and reaches a maximum when the third formation is being milled. The variation in degree of deflection arises because of the progressive removal of metal from the intermediate portion of the reamer and the greater tendency for that portion, and the mandrel as a whole, to flex or bend when subjected to the force of the machining tool.

FIGURE 5 illustrates in exaggerated and somewhat diagrammatic form the machining of a mandrel by a rotating tool 29 and the longitudinal flexure which tends to occur in the mandrel, particularly when the last of a series of segment-supporting surfaces 28 is being formed. Arrow 30 indicates the direction of rotation of the cutter while arrow 31 indicates the direction of applied force which is necessary in order to maintain the mandrel and cutting tool in contact and which brings about the problem of mandrel flexure described above.

As a first step in eliminating the effects of differences in the segment-supporting formations 24—26 of the mandrel, each of the three segment-supporting surfaces is provided with a distinctive marking following the machining of the mandrel. Thus, as shown in FIGURE 1, the surface of formation 26 bears an indicia marking "3." The surfaces of the other formations 24 and 25 bear other markings such as, for example, "1" and "2" respectively.

The markings are permanently applied or formed in the surfaces by etching or by any other suitable means.

Following machining and inscription of the mandrel, reamer 10 is at least partially assembled and three reamer segments 21 are firmly seated upon the segment-supporting formations bearing the markings "1," "2," and "3." As shown in FIGURE 6, each of the segments bears a marking 33 corresponding with the marking of the formation upon which the particular segment is anchored. Here again, the markings are permanently applied to or formed in the segments. Where the markings 32 on the segment-supporting formations are "1," "2," and "3," the same numbers appear on the segments seated on those formations.

The cutting segments 21 mounted upon the mandrel are complete except that the lands or teeth 34 have not been finish ground. In other words, prior to assembly of the mandrel and cutting segments the segments are hardened or case-hardened (as by nitriding) and are chromium plated. Thereafter, the cutting segments are anchored upon the mandrel and, as shown in FIGURE 6, the teeth of the segments are finish ground by rotating the mandrel to bring the teeth 34 into contact with a grinding wheel 35. Any suitable tooth-sharpening means may be employed but, in any case, it is important that the teeth be sharpened to provide cutting edges at equal distance from the mandrel's rotational axis at any point along the segment-supporting portion of the reamer.

As a result of the method so described, a circle circumscribing the cutting edges of the assembled reamer will be co-axial with the mandrel 11. This will occur despite the fact that the radial dimensions of the several segment-bearing formations may vary because of mandrel deformations inherent in the machining operation. Furthermore, the segments may be removed from the mandrel (by compressing spring 19 or by removing nut 20 to relieve the force of that spring) and may later be replaced upon the segment-supporting formations without fear that the reamer is no longer in round. Each segment is custom-fitted and finish ground in position upon a given segment-bearing formation and, by reason of the corresponding indicia, may easily be returned to its desired position.

While in the foregoing I have disclosed an embodiment of the invention in considerable detail for purposes of illustration it will be understood by those skilled in the art that many of these details may be varied without departing from the spirit and scope of the invention.

I claim:

1. In a reamer forming method, the steps of successively machining a plurality of circumferentially-spaced segment-supporting surfaces in a mandrel, said surfaces being of slightly different distances from the longitudinal axis of said mandrel, permanently marking each of said surfaces with a distinctively different indicia marking, locating and fitting upon said surfaces a plurality of cutting segments bearing markings corresponding with the indicia markings of said surfaces, and grinding the cutting edges of said segments while the same are in place upon said mandrel to form sharpened edges at the same radial distance from the mandrel's longitudinal axis along any selected transverse plane despite differences in the relative thickness of said segments.

2. In a reamer forming method in which an elongated mandrel is successively machined intermediate the ends thereof to provide a plurality of circumferentially-spaced segment-supporting formations of slightly different relative distances from the mandrel's longitudinal axis, the steps of marking each of said segment-supporting formations with an identification mark distinguishing it from the others of said plurality of formations, marking a plurality of unfinished cutting segments with mutually distinctive markings corresponding with said formation markings, fitting said segments upon the corresponding formations, and thereafter finish-grinding the cutting edges of said segments while said segments are secured upon said mandrel to form sharpened edges at the same radial distance from the mandrel's longitudinal axis along any selected transverse plane despite differences in the relative thickness of said segments.

3. In an expansion reamer forming method in which an intermediate portion of a mandrel is reduced in thickness by successive machining operations in which three circumferentially-spaced and axially elongated segment-supporting surfaces are formed, said segment-supporting surfaces being of different respective distances from the reamer's axis because of the unequal extent of flexing of said reamer during said successive machining operations, the steps of permanently marking said surfaces with mutually distinctive identification marks, fitting upon said surfaces three unfinished cutting segments having permanent markings corresponding with the markings of said segment-supporting surfaces, and thereafter finish-grinding said segments while the same are in place upon said mandrel to provide cutting edges concentric with the longitudinal axis of the mandrel and to provide reamer segments of different thickness.

References Cited in the file of this patent

UNITED STATES PATENTS

| | | |
|---|---|---|
| 2,359,296 | Broga et al. | Oct. 3, 1944 |
| 2,398,310 | Howell | Apr. 9, 1946 |
| 2,582,524 | Blazek | Jan. 15, 1952 |

OTHER REFERENCES

Dyke's Automobile Encyclopedia, 22nd edition (1950), published by Goodheart-Willcox Co. Inc., Chicago, Ill.